US009767850B2

(12) United States Patent
Brough

(10) Patent No.: US 9,767,850 B2
(45) Date of Patent: Sep. 19, 2017

(54) METHOD FOR EDITING MULTIPLE VIDEO FILES AND MATCHING THEM TO AUDIO FILES

(71) Applicant: Michael Brough, Aliso Viejo, CA (US)

(72) Inventor: Michael Brough, Aliso Viejo, CA (US)

(*) Notice: Subject to any disclaimer, the term of this patent is extended or adjusted under 35 U.S.C. 154(b) by 472 days.

(21) Appl. No.: 14/022,159

(22) Filed: Sep. 9, 2013

(65) Prior Publication Data
US 2015/0071619 A1 Mar. 12, 2015

Related U.S. Application Data
(60) Provisional application No. 61/698,586, filed on Sep. 8, 2012, provisional application No. 61/816,613, filed on Apr. 26, 2013.

(51) Int. Cl.
G11B 27/00 (2006.01)
G11B 27/10 (2006.01)
G11B 27/031 (2006.01)

(52) U.S. Cl.
CPC .......... *G11B 27/10* (2013.01); *G11B 27/031* (2013.01)

(58) Field of Classification Search
CPC . G11B 27/34; G11B 27/105; H04N 21/47202
USPC .......... 386/241, 278, 281, 285, 286; 725/88; 715/723–725
See application file for complete search history.

(56) References Cited

U.S. PATENT DOCUMENTS

| | | | |
|---|---|---|---|
| 2006/0015904 A1* | 1/2006 | Marcus | 725/46 |
| 2006/0184980 A1* | 8/2006 | Cole | 725/88 |
| 2007/0262995 A1* | 11/2007 | Tran | 345/473 |
| 2010/0220978 A1* | 9/2010 | Ogikubo | 386/95 |
| 2011/0289413 A1* | 11/2011 | Ubillos et al. | 715/723 |
| 2012/0308209 A1* | 12/2012 | Zaletel | G11B 27/034 386/278 |
| 2013/0343729 A1* | 12/2013 | Rav-Acha et al. | 386/285 |
| 2014/0096002 A1* | 4/2014 | Dey | G06F 3/0488 715/723 |
| 2014/0320697 A1* | 10/2014 | Lammers | H04N 1/00198 348/231.99 |

* cited by examiner

Primary Examiner — Thai Tran
Assistant Examiner — Mishawn Hunter
(74) Attorney, Agent, or Firm — Eric B. Alspaugh, APC

(57) ABSTRACT

A software application for mobile devices enables users to easily create a fully-edited short video by combining video clips of various lengths to form a final video that resembles a Hollywood-style, professionally edited video clip. The videos are automatically edited to the music cuts using pre-programmed storyboards and transitions that align with the user's thematic selection. There are few steps involved in the process making for a user-friendly experience. The professional style video clip is produced on a user's phone in only 45 seconds and can then be shared with friends via email, YouTube, Facebook and other forms of social media.

6 Claims, 2 Drawing Sheets

METHOD FOR EDITING MULTIPLE VIDEO FILES AND MATCHING THEM TO AUDIO FILES

CROSS-REFERENCE TO RELATED APPLICATION

U.S. provisional application No. 61/698,586 dated Sep. 8, 2012 entitled "Automatic Editing of Video Clips Timed To Music on a Mobile Device" the contents of which are hereby incorporated by reference.

FIELD OF THE INVENTION

This invention relates to the automatic editing of video clips with accompanying musical renditions of video clips obtained with a mobile device.

BACKGROUND OF THE INVENTION

Mobile devices are often used to capture short compressed video clips that are, sent to friends over the Internet. As people have more videos they increasingly seek to organize their videos into a sequence, or single video that communicates to friends the story of an experience. In such instances the sequence of clips does not present a coherent message without some editing. There are two basic options for editing a video clip and concatenating with other video clips: first since compressed video inherently has a fixed number of possible edit points the obvious method is to use those edit points for cutting. The second option is to cut a video at arbitrary points other than those fixed points. However cutting at arbitrary points requires re-encoding the video and this is a computationally intensive process. Thus there is a trade-off between the accuracy of the edits and the amount of time it takes to render the final video. A video with precise and arbitrary edits may be better synchronized to an audio track but may require several minutes of rendering time, and manual edit point choice greatly increases the users time in the app. By contrast, overlaying video segments cut to uniform length (determined by the video format) can be accomplished much faster but will be synchronized less well and gives users less freedom to make decisions.

Therefore, there is a gap in the market for an application that will: automatically edit your videos/pictures to movie quality soundtracks; easily create the product in a 1, 2, 3 process; create a "Hollywood" style effect.

BRIEF SUMMARY OF THE INVENTION

An object of the present invention is to provide a video and audio editing software application that can run on a mobile phone, tablet, or other mobile device.

Another object of the present invention is to provide a video and audio editing software application that can concatenate large numbers of compressed videos into a single shorter one.

Another object of the present invention is to provide a video and audio editing software application that can produce the matched video and audio in a short amount of time.

Another object of the present invention is to provide a video and audio editing software application that can produce the synchronized media without requiring much time from the user.

Another object of the present invention is to provide video and audio editing software that enables the resulting movies to be shared via social media.

Another object of the present invention is to provide video and audio editing software that enables users to automatically edit their own videos/pictures to movie quality soundtracks.

Another object of the present invention is to provide a video and audio editing software that enables users to easily create the product in a 1, 2, 3 process.

Another object of the present invention is to provide video and audio editing software that enables users to create a "Hollywood" style effect.

Another object of the present invention is to provide video and audio editing software that enables a multitude of different users, including, but not limited to: businesses, travelers, video editors, families, students, to make the product.

Another object of the present invention is to provide video and audio editing software that enables users to increase the quality of the video without requiring additional input from users.

The present invention achieves its objects by providing a software application that enables automatic paring of video files to audio files. The manners in which the invention achieves its objects and other objects which are inherent in the invention will become more readily apparent when reference is made to the accompanying drawings wherein like number indicate corresponding parts throughout.

DESCRIPTION OF RELATED ART

U.S. Pat. No. 8,528,027 (Gandolph, et al.) teaches a method and apparatus for synchronizing data streams containing audio, video, and/or other data.

U.S. Pat. No. 8,528,036 (Davis, et al.) teaches media processing and arrangements.

U.S. Pat. No. 8,527,646 (Khatib, et al.) teaches rendering in a multi-user video editing system.

U.S. Pat. No. 8,526,782 (Kaiser, et al.) teaches a method for switched annotations in playing audiovisual works.

U.S. Pat. No. 8,527,859 (Henshall, et al.) teaches dynamic audio playback of soundtracks for electronic visual works.

DETAILED DESCRIPTION OF THE INVENTION

Figure 1:
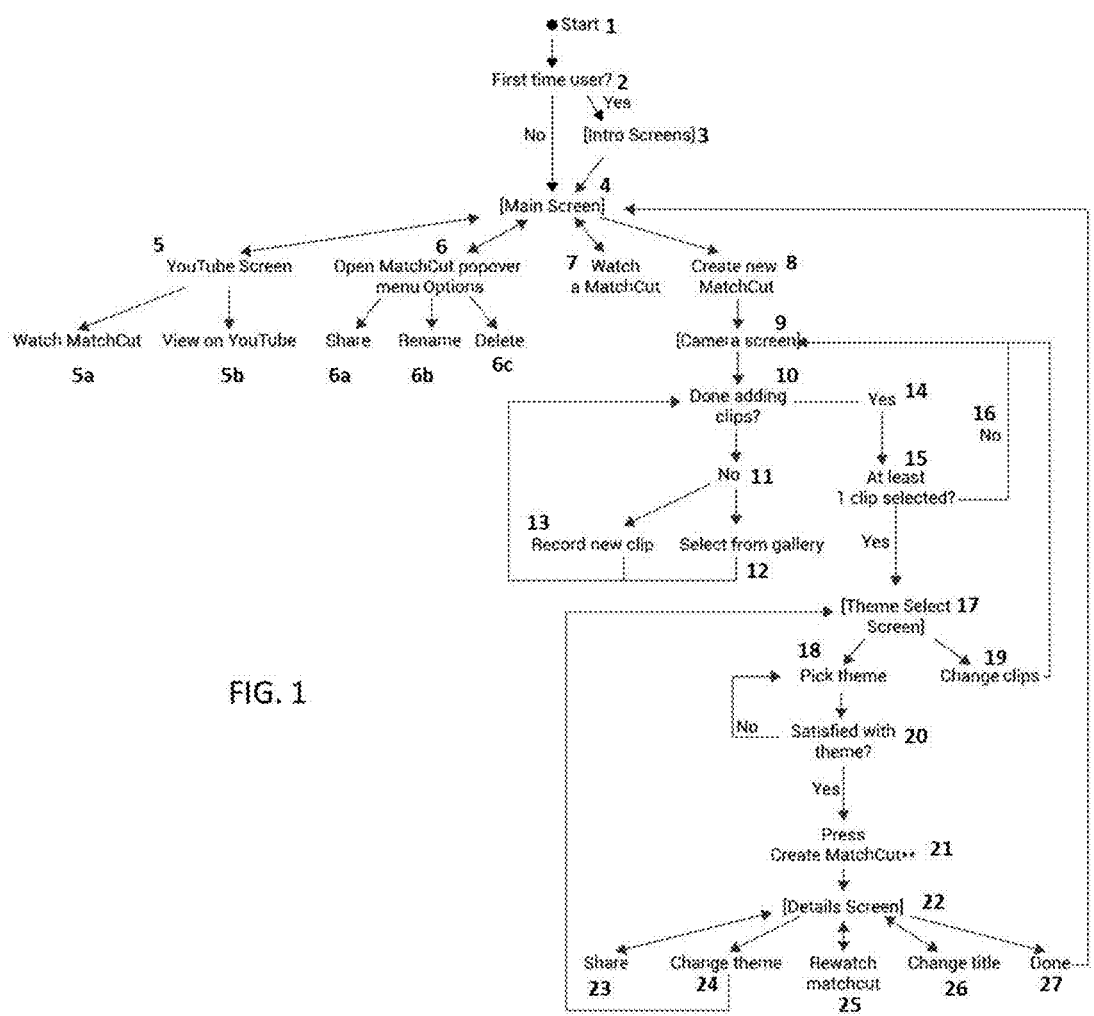
FIG. 1 is a flow diagram of the sequence of operations to determine the audio queues of a musical composition in the library and a user's operation in accordance with the principles of this invention.

Referring now to the drawings wherein the showings are for purposes of illustrating a preferred embodiment of the present invention and not for purposes of limiting the same, a first embodiment of the invention is a software application that enables automatic pairing of video files to audio files illustrated in FIG. 1. The flow diagram depicts the sequence of steps a user will go through in order to pair videos to audio.

The process begins when the application starts on a user's mobile device and loads a splash screen with a logo 1. Next the application prompts the user to state whether they are first time user of the application or not 2. If the user answers "yes" they are directed to an Introduction screen 3. If the user answers "no" they are directed to the Main Screen 4. At the Main Screen, 4, the user can choose from the YouTube™ Screen, 5, which contains options to Watch MatchCut 5a or View on YouTube™ 5b; the Open MatchCut Popover Menu Options Screen 6, which contains options to Share 6a, Rename 6b, or Delete 6c; the Watch a MatchCut Screen 7; and the Create New MatchCut Screen 8. To create a MatchCut 8 the user starts at the Camera Screen 9 where they can take a video and then add the video clip to the queue. Clicking on this button will launch the mobile phone gallery and allow the user to populate the queue with the user's selection of videos. The application then prompts the user as to whether they are done adding video clips 10. If the user answers "no" 11, the user may then select another clip from the gallery 12 or may record a new video clip 13. The system then prompts the user again whether they are done adding clips 10. If the user answers "yes" 14 the system checks that at least one video clip has been added 15. If no video clips have been added 16 the system returns to the Camera Screen 9. If at least one video clip has been selected then the system presents the Theme Select Screen 17. At this point the user has the option of either Pick Theme 18 or Changing Clips 19. If the user chooses to Change Clips 19 the user is returned to the Camera Screen 9. If the user picks a theme 18 then the systems prompts to user as to whether they are satisfied with the theme 20. If the user answers "no" they are returned to the Theme Selection Screen 18. If the user answers yes they are prompted to "Press Create MatchCut" 21. The system then creates the MatchCut file in 45 second or less, presents the user the created MatchCut, and takes the user to a screen where the mash-up can be reviewed, the Details Screen 22. On the Details Screen 22 a user may choose to Share 23 the MatchCut, which includes uploading to a video host such as YouTube™. The publish button will being the upload process and handle the sharing. If the user is not already logged into the service, a login overlay will appear. On the Details Screen 22 the user may also Change Theme 24, clicking on this will take the user back to the Theme Select Screen 17 where they are presented with an expandable list type menu, but may also be a spinner type menu overlay from which the user can select a new theme. On the Details Screen 22 the user may also choose to Rewatch MatchCut 25, Change Title 26 or choose to exit the system 27. It is understood that reference to YouTube® is as a video hosting site and that any video hosting site could serve the purpose as disclosed herein. Examples of other social media sites are Facebook, Dailymotion, and Tumblr.

Figure 2:
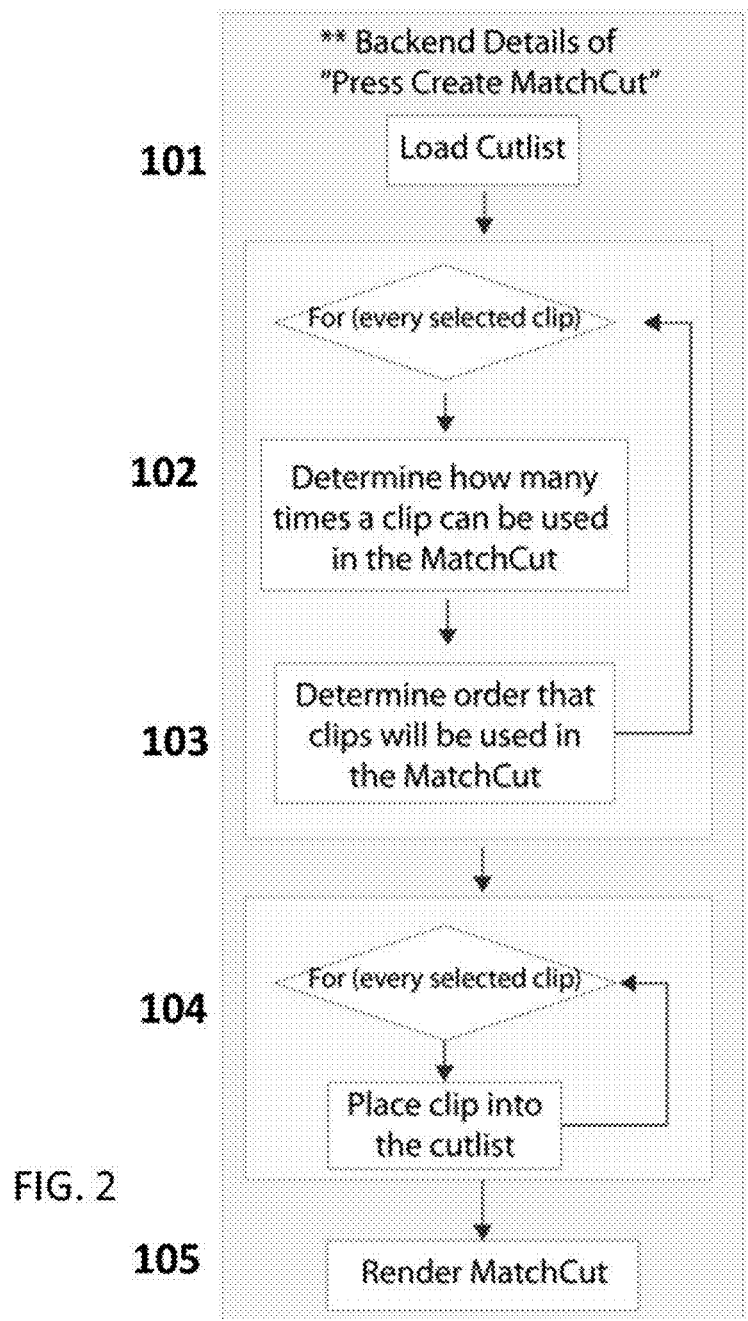
FIG. 2 is a flow diagram of the sequence of operations in the back end details of the "Press Create MatchCut" button.

A second embodiment of the invention is a software application that enables automatic pairing of video files to audio files illustrated in FIG. 2. The flow diagram depicts the sequence of steps a user will go through in order to pair video to audio when the "Press Create MatchCut" button is pressed. Clicking on this button will take the videos in the queue and create a MatchCut based on the selected theme.

For a given music track, a Cutlist will be created where the cut times correspond to musical cues in the track, usually downbeats or beginnings of new musical phrases. Each song will have a predetermined Cutlist made from the audio file that is created outside the app and stored on the device. The phone or mobile device will come with several themes, and each theme will include a database of music with pre-set cut times. The first step in the process of creating a MatchCut is to Load the Cutlist for the audio file 101. The cuts in a simple embodiment may be on whole seconds only but in other embodiments may be at fractions of a second. The Cutlist depends only on the music track, not the videos—no matter what videos are input, the final product will have cuts at the same time.

When a user selects a set of video clips and a theme and wants to create a MatchCut, the first step is to determine how to fit the video clips into the audio file Cutlist. This can be done in a variety of ways. For example the video cuts can be mapped to the audio cuts sequentially and starting with a different video cut each time to produce different results. So long as at least one selected video is as long as the longest audio cut it will be possible to create a MatchCut. For every video clip selected to be in the MatchCut, a determination is made as to how many times that clip can be used 102. This is determined by calculating the proportion of each clips' length to the total of all clips (always rounded up, or CEILING), multiplied by the number of audio cuts, to give a proportional count. The minimum of these counts is then used to sort the video clips by increasing count 103. Doing this ensures that the shortest clips are always present in the final video and the appearance of clips is roughly in proportion to their lengths.

The clips are placed into the Cutlist in three passes 104. On the first pass, the lowest count cut is placed in the first available spot that it can fill with empty spots on both sides, or in the case of the first and last spot that it can fill with an empty spot on the only other side. Once the full list is traversed, that is all the video clips which can be placed in cuts based on the above rule are placed, the second pass begins. In the second pass, the next clip to be placed is placed in the all available cuts, as long as the same clip is not used in the prior or subsequent cut and the clip to be placed is sufficiently long for the cut. Higher count video clips are then placed in according to the same second pass rule. In the event the audio Cutlist is not filled then the third pass begins wherein the highest count video is used to fill gaps. The final step is to calculate the start times for each cut. This is currently done as a proportion of the clip number to the length within the clip that the cut can fit. This is only the rule in one preferred embodiment and other schemes for mapping video to audio could be used. Finally the MatchCut is Rendered 105.

A third embodiment comprises integrating portions of existing videos such as from MTV or commercials from television with portions of users original video. Thus, users can make derivative works easily for parody or other purposes. In this example the audio portions could be preserved from the original or audio from the user.

Several examples of the process described herein are illustrated below:

The app edits the videos programmatically, but the edits are done according to a cutlist that is created manually ahead of time. For a given music track, there will be a cutlist that looks something like this:

Cut 1 03:16.02
Cut 2 06:24.53
Cut 3 10:03.03
Cut 4 13:11.54
Cut 5 16:20.44
Cut 6 19:29.35
Cut 7 21:18.21
Cut 8 23:07.26
Cut 9 26:16.76

Here the cut times correspond to musical cues in the track, usually downbeats or beginnings of new musical phrases. These are the cuts that need to be determined manually by an editor or composer, and it only has to be done once per track. It may be possible to automate the process someday, but the best results will probably always need to be done manually.

Users' video clips are cut to match the lengths already defined in the cutlist associated with a given music track (which we sometimes refer to as a theme). The cutlist depends only on the music track, not the videos—no matter what videos are input, the final product will have cuts at the same time.

Here's a simplified example:

Given a 30 second music track, an editor looks at the music and determines the following cutlist to match dramatic parts of the music (these simplified cuts are on whole seconds only):

Cut 1: 00:03
Cut 2: 00:06
Cut 3: 00:10
Cut 4: 00:15
Cut 5: 00:25

If a user chooses two videos (A and B), the app will take those two videos and map them into the cutlist. Here's an example of how the final video might end up:

| time | contents |
| --- | --- |
| 00-00:03 | 3 seconds of video A |
| 00:03-00:06 | 3 seconds of video B |
| 00:06-00:10 | 4 seconds of video A |
| 00:10-00:15 | 5 seconds of video B |
| 00:15-00:25 | 10 seconds of video A |
| 00:25-00:30 | 5 seconds of video B |

Now, if a user then chooses four videos (A, B, C, D), the app will take those four videos and map them into the same cutlist. Here's an example of how the second final video might end up:

| time | contents |
| --- | --- |
| 00-00:03 | 3 seconds of video A |
| 00:03-00:06 | 3 seconds of video B |
| 00:06-00:10 | 4 seconds of video C |
| 00:10-00:15 | 5 seconds of video D |
| 00:15-00:25 | 10 seconds of video B |
| 00:25-00:30 | 5 seconds of video A |

Either way, the cuts match the music playing along with the video. The only limitations in this case are that the videos must be at least 3 seconds long, and at least one video must be 10 seconds or more. For best results, we would like to encourage the user to use longer clips, usually 15 to 20 seconds.

Mapping clips into a cutlist:

When a users selects a set of clips and a theme and wants to create a matchcut, the first step is to create a cutlist fitting the clips into the cuts in the theme. There are many ways to do this, depending on the input videos.

In early versions of the app, all clips had to be at least 15 seconds long, so the cutlist was mapped by using the input clips in a repeating order, starting with a random clip to give the user different results for multiple runs. Given 4 input clips: A, B, C, D, they would be mapped into a simple cutlist like this:

Cut 1-3 seconds of clip A
Cut 2-5 seconds of clip B
Cut 3-4 seconds of clip C
Cut 4-3 seconds of clip D
Cut 5-10 seconds of clip A
Cut 6-5 seconds of clip B For the more sophisticated version, the 15 second limit was removed, allowing for shorter videos, as long as one video was long enough for the longest cut. In the simple example above, cut 5 being 10 seconds long means at least one input clip must be 10 seconds or longer. The other clips can be shorter, and as long as they are longer then 3 seconds (the length of cuts 1 and 4), they will be used in the final matchcut.

The first step in the cutlist mapping is to determine how many times a clip can possibly be used in the final matchcut. Given the following input clip lengths:

clip A—15 seconds
clip B—8 seconds
clip C—4 seconds
clip D—3 seconds

They have the following possible clip counts:

A: 6
B: 5
C: 3
D: 2

The second step is to calculate the proportion of each clips' length to the total of all clips (always rounded up, or CEILING), multiplied by the number of cuts, to give a proportional count. For our example, this is:

A: CEILING(15/30)*6=3
B: CEILING(8/30)*6=2
C: CEILING(4/30)*6=1
D: CEILING(3/30)*6=1

Next, take the minimum of these two counts, which in this example is only the second calculation, and sort the videos by increasing count:

D:1
C:1
B:2
A:3

This will be the order that the clips are placed into the cutlist, which ensures that the shortest clips are always present in the final video and the appearance of clips is roughly in proportion to their lengths.

The clips are placed into the cutlist in three passes. On the first pass, a cut will be placed in first available spot that it can fill with empty spots on both sides. In our example, D and C are both placed on the first pass. After these two are placed, the cutlist looks like this:

cut 1:D
cut 2:
cut 3:
cut 4:C
cut 5:
cut 6:

Note, C was not placed in cut 2 since cut 1 was already occupied. It was not placed in cut 3 since it was too short.

For placing clip B, it cannot be placed in cuts 2, 3, or 5 because cuts 1 and 4 are occupied, but it can be placed in cut 6. Since the full list has been traversed, the second pass will take place. In the second pass, the clip is placed in the first available cut, as long as the same clip is not used in the previous or next cut. In this case, the second clip B will be placed in cut 2, giving:

cut 1:D
cut 2:B
cut 3:
cut 4:C
cut 5:
cut 6:B

For the final clip, A, there is no possible placement on the first pass, and it is placed twice in the second pass. Since the cutlist is full, the third clip A is never used. The final cutlist is:

cut 1:D
cut 2:B
cut 3:A
cut 4:C
cut 5:A
cut 6:B

The third pass is not necessary in this example, but it is used to fill in any gaps using videos with the most possible cuts (A only in this case, but could be more videos if they are tied for most possible cuts).

The last step is to calculate the start times for each cut. This is currently done as a proportion of the clip number to the length within the clip that the cut can fit. For the example the cut start times are as follows:

cut 1:D (1/6)*(3−3)=0s
cut 2:B (2/6)*(8−4)=1s
cut 3:A (3/6)*(15−5)=5s
cut 4:C (4/6)*(4−4)=0s
cut 5:A (5/6)*(15−10)=4s
cut 6:B (6/6)*(8−5)=3s Note that this is only one possibility and other schemes can be used for different results.

It will be understood that various modifications can be made to the various embodiments of the present invention herein disclosed without departing from the spirit and scope thereof. Therefore, the above description should not be construed as limiting the invention, but merely as an exemplification of preferred embodiments thereof. Those of skill in the art will envision other modifications within the scope and sprit of the present invention as defined by the claims appended hereto.

The invention claimed is:

1. A method of playing one or more clips along with a selected musical theme with a mobile device comprising: storing in said device a plurality of musical themes, preparing a cutlist of the occurrence of musical cues in each of said themes, storing one or more video clips in said device, a user selecting a musical theme, the user further selecting the at least one or more video clips, playing said one or more clips synchronously with a selected theme, cutting said one or more clips at times therein corresponding to the cutlist of the selected theme, and organizing said one or more clips with a continuous audio track wherein said one or more clips has a duration of greater than three seconds; and wherein said one or more clips of different durations; and determining how many times a clip of said one or more clips is used comprising calculating the proportion of the length of each of said one or more clips to the total length of all said clips.

2. A method as in claim 1 comprising multiplying the proportion of claim 1 by the number of said cuts.

3. A method of creating a video with an accompanying musical theme with a mobile device comprising storing in said mobile device a plurality of musical themes, storing in said device a cutlist of musical cues in each of said themes, storing one or more clips in said mobile device, a user selecting a stored musical theme, the user further selecting the at least one or more video clips selecting from said video a plurality of scenes of durations determined by said cutlist, forming a sequence of the selected scenes, into an audio track wherein said selecting comprises calculating the proportion of the length of each of said one or more clips to the total length of all of said clips, multiplying each calculated proportion by the number of said cuts.

4. A method as in claim 3 comprising determining the number of times a clip is used in said audio track.

5. A method of playing one or more clips along with a selected musical theme with a mobile device comprising: storing in said device a plurality of musical themes, preparing a cutlist of the occurrence of musical cues in each of said themes, storing one or more video clips of at least 3 seconds duration in said device, selecting a musical theme, playing said one or more clips synchronously with a selected theme, cutting said one or more clips at times therein corresponding to the cutlist of the selected theme, determining how many times a clip of said one or more clips is used, calculating the proportion of the length of each of said one or more clips to the total length of all said clips, and organizing said one or more clips with a continuous audio track.

6. A method of creating a video with an accompanying musical theme with a mobile device comprising storing in said mobile device a plurality of musical themes, storing in said device a cutlist of musical cues in each of said themes, storing one or more clips in said mobile device, selecting a stored musical theme, selecting from said video a plurality of scenes of durations determined by said cutlist, calculating the proportion of the length of each of said one or more clips to the total length of all of said clips, multiplying each calculated proportion by the number of said cuts and determining the number of times a clip is used in said audio track, forming a sequence of the selected scenes, into an audio track.

* * * * *